Feb. 6, 1962 L. R. SEPLAVY 3,020,015
JACKSTAND
Filed Nov. 24, 1959
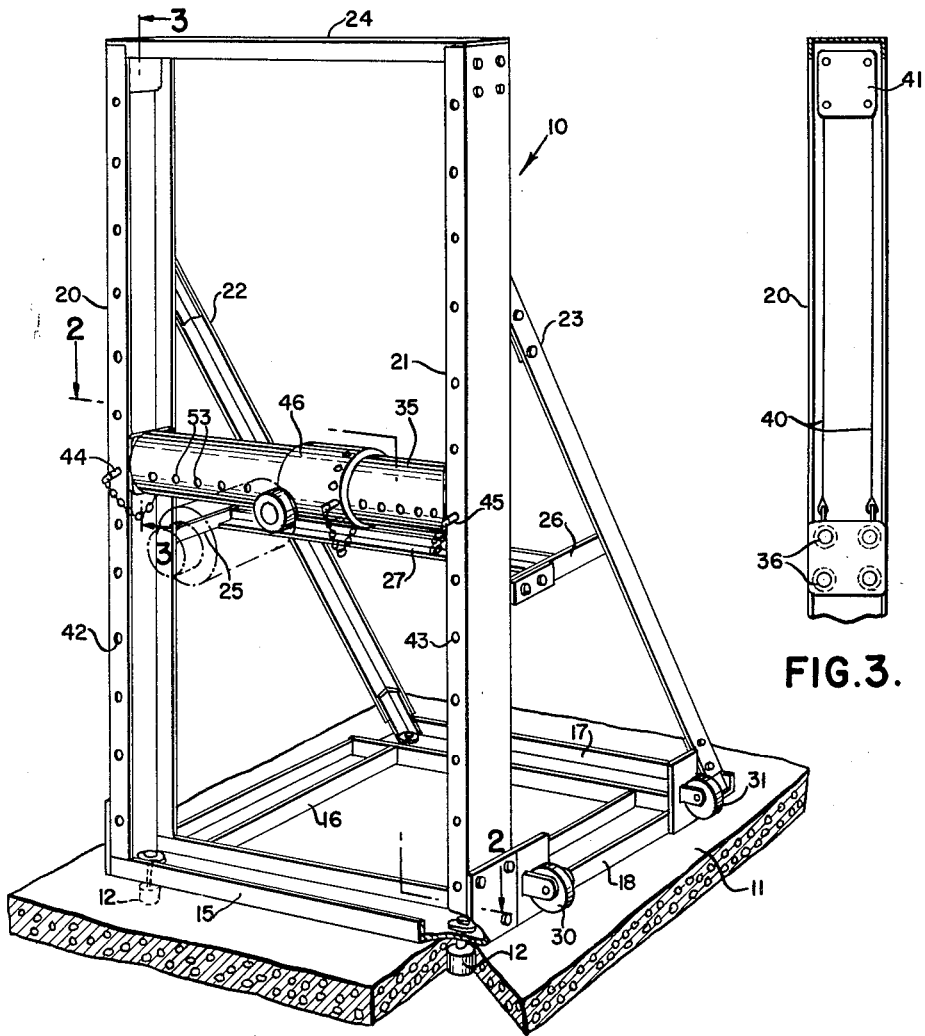
FIG.1.
FIG.3.
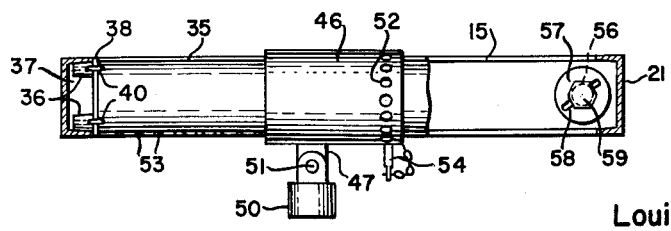
FIG.2.
INVENTOR
Louis R. Seplavy
BY *Fidelman & Lavine*
ATTORNEYS

United States Patent Office 3,020,015
Patented Feb. 6, 1962

3,020,015
JACKSTAND
Louis R. Seplavy, 471 S. Broadway, Hicksville, N.Y.
Filed Nov. 24, 1959, Ser. No. 855,086
8 Claims. (Cl. 248—123)

The present invention relates to a jackstand, and more particularly to a jackstand having a coupling to which a jack may be attached, the coupling being supported by frame members so that it may be positioned in any one of a large number of positions.

In the repairing of automobile frames and bodies (including fenders) it is often necessary to apply a large force to the part of the automobile that has been deformed in order to restore it to its original shape. In order to exert forces of the magnitude required, it has been found necessary to provide certain mechanical equipment.

Such frame and body bending equipment has fallen, generally, into two categories. In a first category, a relatively expensive installation is provided, which installation usually includes a fixed supporting structure of heavy I-beams. Onto this heavy supporting structure, the car to be repaired is placed, and/or there is placed on this structure the necessary hydraulic or mechanical jacks which are used to actually exert the necessary forces.

In order to avoid the expenses entailed in the provision of the structures of the first category, there have been provided various small, lightweight and portable jacks, which jacks are operated either hydraulically or mechanically. In some instances, these jacks have been supported only by the mechanic using them, and thus the amount of force that could be exerted has been limited. In other instances, it has been attempted to back up the jack against some already existing structure in the garage where the work is being performed. As will be understood, however, such techniques in auto repair have left much to be desired, since the jacks could not readily be positioned as needed and could not be directed as needed in order to exert their restoring force onto the frame at the proper place and in the proper direction.

An object of the present invention is to provide a stand for a jack to be used in automobile frame and body repair work.

Another object of the present invention is the provision of a stand for a jack which stand may be readily moved and readily attached to the floor of the garage.

Yet another object of the present invention is to provide a stand for jacks which stand may be adjusted over a wide range to support a jack at any point within the range and in any direction.

A still further object of the present invention is the provision of a stand for jacks which may be economically constructed and which will be sufficiently sturdy to withstand the large loads generated by the jack.

Other objects and the nature and advantages of the instant invention will be apparent from the following description taken in conjunction with the accompanying drawings, wherein:

FIG. 1 is a perspective view of a stand in accordance with the present invention, secured to the floor of a garage.

FIG. 2 is a cross-sectional view taken on the line 2—2 of FIG. 1.

FIG. 3 is a cross-sectional view taken on the line 3—3 of FIG. 1.

Referring now to the drawings, wherein like reference numerals are used to designate like or corresponding parts throughout the several views, there may be seen in FIG. 1 a stand 10 resting on the floor 11 of a garage or the like. It is contemplated that the garage will have a part thereof set aside for frame and body repair work, and to this end there will be provided several rows of screw-threaded bolt-receiving devices 12 in the floor 11. Preferably, there will be two such rows arranged in concentric rectangular patterns, the space within the smaller rectangle being for the positioning of the automobile to be repaired.

The stand 10 comprises a base made of the four channel members 15, 16, 17, and 18. A pair of spaced vertically extending and inwardly facing channels 20 and 21 is secured to the base, and inclined angle irons 22 and 23 are connected near the tops of the channels 20 and 21, respectively, and to the base. Other base structure includes the member 24 extending between the channels 20 and 21 at the tops thereof, and the horizontally extending members 25 and 26 which are connected to the channel 20 and angle iron 22 and the channel 21 and angle iron 23, respectively. A tie member 27 may also be seen to extend between the members 25 and 26.

A pair of wheels 30 and 31 are secured to a side of the stand 10 with the lowest point on the periphery of these wheels slightly above the bottom surface of the channels 15, 16, 17, 18. By appropriate tilting action, the weight of the stand 10 will rest on the wheels 30 and 31 to enable the stand to be readily transported from place to place.

A hollow cylindrical support beam 35, which is preferably in the form of a pipe, extends between the channels 20 and 21, support beam 35 having at either end thereof four outwardly extending and tapered rollers 36. These rollers 36 are rotatably mounted on shafts 37 (see FIG. 2) which extend from a plate 38 that is secured to the support beam 35. These rollers 36 permit movement of the support beam 35 vertically, the rollers 36 reducing friction between beam 35 and the channels 20 and 21, and at the same time preventing the support beam 35 from rotating.

As may be seen from FIG. 3, cables 40 extend upwardly from the plate 38 and are connected with a spring loaded sash balancing device 41, it being understood that a balancing device 41 is provided in the upper end of each of the channels 20 and 21 and that the cables 40 extend from each of the devices 41 to the respective end of the support beam 35.

The channels 20 and 21 are provided with a longitudinally extending series of spaced holes 42 and 43, and suitable stop pins 44 and 45 are provided so that by utilizing the holes 42 and 43 and the stop pins 44 and 45 the support beam 35 may be secured in any of a plurality of vertically spaced positions.

On the support beam 35 there is a sleeve 46, sleeve 46 having an apertured ear 47 (see FIG. 2) extending therefrom, to which is pivotally connected a coupling 50. Coupling 50 is provided with spaced apertured ears between which the ear 47 on sleeve 46 extends, and a suitable screw 51 is used to secure the coupling 50 in adjusted position relative to the sleeve 46. Coupling 50 is threaded and rotatable.

Sleeve 46 is provided with a series of circumferentially extending holes 52, and a longitudinally extending series of holes 53 in support beam 35 is also provided. It will thus be seen that by utilizing the stop pin 54, sleeve 46 may be secured in any of a plurality of positions along support beam 35, and may additionally be secured in any of a number of relatively rotated positions thereon.

To secure the stand 10 to the devices 12 in the floor 11, the horizontal members 15, 16, 17 and 18 are provided, at the ends thereof, with a hole, and reference is had to the right-hand side of FIG. 2 for a showing of the hole 56 in the bottom channel member 15. Overlying the hole 56 is a washer 57 of somewhat larger diameter than hole 56, washer 57 having an elongated opening 58 therein. A securing bolt 59 of smaller bolt diameter than hole 56 extends through the opening 58 in washer 57 and hole 56, and by the arrangement thus provided the bolt 59 may be adjusted laterally so as to precisely overlie a device 12. By this construction, the stand 10 may be placed approximately in position and the positions of the bolts 59 adjusted as necessary to overlie the respective devices 12.

In use, the stand 10 is moved on the wheels 30 and 31 into position and is secured to the floor 11 by means of the adjustable bolts 59, as hereinabove described. Thereafter, the support beam 35 is moved vertically to the desired level and the pins 44 and 45 inserted to maintain support beam 35 at that level. During movement of support beam 35, the tapered rollers 36 guide the support beam 35 in the channels 20 and 21, and the balancing devices 41 contribute to the ease of movement of support beam 35. Thereafter, sleeve 46 is adjusted along support beam 35 and is rotated so that the coupling 50 extends outwardly, upwardly or downwardly, i.e., in the desired direction. The pin 54 is inserted and it is only necessary to join the jack to the coupling 50 and to thereafter activate the jack as desired.

It will be obvious to those skilled in the art that various changes may be made without departing from the spirit of the invention and therefore the invention is not limited to what is shown in the specification but only as indicated in the appended claims.

What is claimed is:

1. Apparatus for use in straightening the frame and body of an automobile comprising a frame having a pair of spaced horizontal members and a pair of spaced vertical facing channels attached thereto, a hollow cylindrical support beam extending between said channels, said support beam having outwardly extending tapered rollers at the ends thereof in each of said channels, cables connected to each end of said support beam and extending upwardly, weight balancing means in the upper ends of said channels having said cables attached thereto, spaced holes in said channels, stop pins engageable in said holes to thereby establish the height of said support beam, a sleeve rotatably positioned on said support beam, said sleeve having a plurality of apertures therein circumferentially thereof, said support beam having a plurality of apertures extending longitudinally thereof, a stop pin for establishing the position of said sleeve, coupling means pivotally carried by said sleeve, said horizontal members having holes therein, a washer over each said hole of larger diameter than said hole, each washer having an elongated opening therein, and a bolt extending through the opening in said washer and the hole in said horizontal members.

2. Apparatus for use in straightening the frame and body of an automobile comprising a frame having a pair of spaced horizontal members and a pair of spaced vertical facing channels attached thereto, a hollow cylindrical support beam extending between said channels, said support beam having outwardly extending tapered rollers at the ends thereof in each of said channels, cables connected to each end of said support beam and extending upwardly, weight balancing means in the upper ends of said channels having said cables attached thereto, spaced holes in said channels, stop pins engageable in said holes to thereby establish the height of said support beam, a sleeve rotatably positioned on said support beam, said sleeve having a plurality of apertures therein circumferentially thereof, said support beam having a plurality of apertures extending longitudinally thereof, a stop pin for establishing the position of said sleeve, and coupling means pivotally carried by said sleeve.

3. Apparatus for use in straightening the frame and body of an automobile comprising a frame having a pair of spaced horizontal members and a pair of spaced vertical facing channels attached thereto, a hollow cylindrical support beam extending between said channels, spaced holes in said channels, stop pins engageable in said holes to thereby establish the height of said support beam, a sleeve rotatably positioned on said support beam, said sleeve having a plurality of apertures therein circumferentially thereof, said support beam having a plurality of apertures extending longitudinally thereof, a stop pin for establishing the position of said sleeve, coupling means pivotally carried by said sleeve, said horizontal members having holes therein, a washer over each said hole of larger diameter than said hole, each washer having an elongated opening therein, and a bolt extending through the opening in said washer and the hole in said horizontal members.

4. Apparatus for use in straightening the frame and body of an automobile comprising a frame having a pair of spaced horizontal members and a pair of spaced vertical facing channels attached thereto, a hollow cylindrical support beam extending between said channels, spaced holes in said channels, stop pins engageable in said holes to thereby establish the height of said support beam, a sleeve rotatably positioned on said support beam, said sleeve having a plurality of apertures therein circumferentially thereof, said support beam having a plurality of apertures extending longitudinally thereof, a stop pin for establishing the position of said sleeve, and coupling means pivotally carried by said sleeve.

5. Apparatus for use in straightening the frame and body of an automobile comprising a pair of spaced vertical facing channels, a hollow cylindrical support beam extending between said channels, a sleeve rotatably positioned on said support beam, said sleeve having a plurality of apertures therein circumferentially thereof, said support beam having a plurality of apertures extending longitudinally thereof, a stop pin for establishing the position of said sleeve, and coupling means pivotally carried by said sleeve.

6. The apparatus of claim 5, said support beam having means at the ends thereof guidingly received in said channels.

7. The apparatus in claim 5, said channels having holes therein and stop pins engageable in said holes to establish the height of said support beam.

8. Apparatus for use in straightening the frame and body of an automobile comprising a sleeve, a coupling, means pivotally securing said coupling to said sleeve about an axis transverse of the sleeve axis, means to position said sleeve in any of a plurality of vertical planes, means to position said sleeve in any of a plurality of locations in a given vertical plane, said apparatus further including a base having wheels mounted on a vertical side thereof, and means for anchoring said base to a supporting surface.

References Cited in the file of this patent

UNITED STATES PATENTS

| | | |
|---|---|---|
| 2,124,006 | Parker | July 19, 1938 |
| 2,197,487 | Smalley | Apr. 16, 1940 |
| 2,599,269 | Markle | June 3, 1952 |
| 2,628,803 | Krewson | Feb. 17, 1953 |
| 2,681,782 | Morishita | June 22, 1954 |
| 2,921,791 | Berne | Jan. 19, 1960 |

FOREIGN PATENTS

| | | |
|---|---|---|
| 512,604 | Great Britain | Sept. 20, 1939 |
| 613,816 | Germany | May 27, 1935 |